United States Patent
Petzel et al.

(10) Patent No.: US 8,226,166 B2
(45) Date of Patent: Jul. 24, 2012

(54) SEATING ELEMENT AND SEATING SYSTEM

(75) Inventors: Jan Petzel, Tuebingen (DE); Thomas Preiss, Mehlingen (DE); Veit Stoessel, Nuremberg (DE); David Anthony Swan, Aurora (CA); Renato Colja, Windsor (CA); Roland Och, Rottendorf (DE); Werner Steger, Hiltpolstein (DE); Klaus Wieder, Nuremberg (DE)

(73) Assignee: Schukra Geraetebau GmbH, Berndorf (AT)

( * ) Notice: Subject to any disclaimer, the term of this patent is extended or adjusted under 35 U.S.C. 154(b) by 0 days.

(21) Appl. No.: 13/204,298

(22) Filed: Aug. 5, 2011

(65) Prior Publication Data

US 2011/0285189 A1 Nov. 24, 2011

Related U.S. Application Data

(63) Continuation-in-part of application No. 11/722,297, filed on May 6, 2010, and a continuation of application No. 11/934,355, filed on Nov. 2, 2007, now Pat. No. 8,011,729, which is a continuation-in-part of application No. 11/722,297, filed as application No. PCT/EP2005/014015 on Dec. 23, 2005.

(30) Foreign Application Priority Data

Dec. 23, 2004 (DE) .......................... 10 2004 062 219

(51) Int. Cl.
*A47C 4/54* (2006.01)

(52) U.S. Cl. ................ 297/284.6; 297/284.8; 297/284.1

(58) Field of Classification Search ............... 297/284.1, 297/284.6–284.8
See application file for complete search history.

(56) References Cited

U.S. PATENT DOCUMENTS

| 4,518,200 | A | * | 5/1985 | Armstrong ................. 297/284.6 |
|---|---|---|---|---|
| 4,746,168 | A | | 5/1988 | Bracesco |
| 5,076,643 | A | | 12/1991 | Colasanti et al. |
| 5,137,329 | A | | 8/1992 | Neale |
| 5,562,324 | A | | 10/1996 | Massara et al. |
| 5,772,281 | A | | 6/1998 | Massara |
| 5,826,937 | A | | 10/1998 | Massara |
| 5,868,466 | A | | 2/1999 | Massara et al. |
| 5,884,968 | A | | 3/1999 | Massara |

(Continued)

FOREIGN PATENT DOCUMENTS

| DE | 8620922 | 10/1986 |
|---|---|---|
| DE | 10046743 | 4/2002 |
| EP | 0485483 | 5/1992 |

(Continued)

OTHER PUBLICATIONS

PCT International Search Report for PCT/EP2005/014015, mailed Apr. 4, 2006.

*Primary Examiner* — Laurie Cranmer (74) *Attorney, Agent, or Firm* — Michael Best & Friedrich LLP (57) ABSTRACT

A seating element has an archable element with a first side to face an occupant of a seat when the seating element is installed in a seat and a second side opposite of the first side. A pneumatic arching element is arranged at the second side of the archable element.

20 Claims, 9 Drawing Sheets

U.S. PATENT DOCUMENTS

| | | |
|---|---|---|
| 5,902,011 A | 5/1999 | Hand et al. |
| 5,967,608 A | 10/1999 | Van Sickle |
| 6,129,419 A | 10/2000 | Neale |
| 6,290,295 B1 | 9/2001 | Benden et al. |
| 6,554,365 B2 | 4/2003 | Karschin et al. |
| 6,758,522 B2 | 7/2004 | Ligon, Sr. et al. |
| 6,874,852 B2 * | 4/2005 | Footitt .................. 297/284.4 |
| 6,916,300 B2 | 7/2005 | Hester et al. |
| 7,255,394 B2 | 8/2007 | Ogura |

FOREIGN PATENT DOCUMENTS

| | | |
|---|---|---|
| EP | 1110809 | 6/2001 |
| EP | 1447070 | 8/2004 |
| FR | 2816261 | 5/2002 |
| FR | 2823475 | 10/2002 |
| WO | 98/54025 | 12/1998 |

* cited by examiner

SEATING ELEMENT AND SEATING SYSTEM

CROSS-REFERENCE TO RELATED APPLICATIONS

This is a continuation-in-part of U.S. patent application Ser. No. 11/722,297, having a 371(c) date of May 6, 2010, and published as U.S. Patent Application Publication No. 2010/0207431 on Aug. 19, 2010. This is also a continuation of U.S. patent application Ser. No. 11/934,355, filed Nov. 2, 2007, and published as U.S. Patent Application Publication No. 2009/0108654 on Apr. 30, 2009, which is a continuation-in-part of U.S. patent application Ser. No. 11/722,297, having a 371(c) date of May 6, 2010, which is a national stage entry of PCT/EP2005/014015, filed Dec. 23, 2005 and published as WO 2006/069764 on Jul. 6, 2006, which claims priority from German Patent Application DE 102004062219 filed Dec. 23, 2004, the entire contents of each of the foregoing are hereby incorporated by reference.

STATEMENT REGARDING FEDERALLY SPONSORED RESEARCH

Not Applicable.

BACKGROUND OF THE INVENTION

The present invention relates to a seating element and a seating system which includes the seating element. It relates particularly to a seating element and a seating system for vehicle seats, particularly in a motor vehicle.

Vehicle seats in modern motor vehicles may contain a large number of different luxury facilities. Known examples of these are seat-heating systems, arching mechanisms for adjusting the curvature or convexity of a seat backrest, particularly in the region of spinal curvature, such as are known from EP 0 48S 483 B1 for example, or massaging facilities.

SUMMARY OF THE INVENTION

According to an embodiment of the invention, a seating element for installation in a seat is provided, wherein the seating element is dimensioned in such a way that it extends, when in an installed condition, over substantially an entire region of a seat backrest and/or of a seating surface of the seat. According to an embodiment of the invention, the seating element has receptacles for receiving functional elements for making available additional seat functions.

Under these circumstances, the seating element can for example be substantially adapted to the contour of a seated human body. In this way, the seating element serves to distribute pressure. Because of the adapted shape, it is not necessary to provide thick upholstery on the seating element. Thinner layers are therefore also possible. On the one hand, this saves on material and, on the other, functional elements which are configured, for example, as massaging elements, can be felt better through a thinner layer.

The seating element may, for example, be produced in one piece by the injection moulding of a plastic material. In the case of seating elements which extend both over the region of the seat backrest and also over the region of the seating surface, a hinging means, for example one or more film hinges, may be disposed between a seat-backrest section and a seating-surface section.

The receptacles for receiving functional elements may, for example, include receptacles for receiving arching elements, it being possible to set the convexity or curvature of the seating element at particular points, for example in a lumbar region, by means of the arching elements. For this purpose, in particular, the seating element may include flat elements, for example plates or else elements consisting of longitudinal and transverse struts, that can be arched at suitable points. The arching element is then disposed so as to be adjacent, particularly on a side that faces away from a user of the seat, to the said element that can be arched, and may arch or curve the latter. It is then possible for example, in a simpler level of equipment, to dispose a stationary element adjacent to the element that can be arched, in order to bring about a fixed curvature.

For this purpose, fixed guides, for example wires, for receiving the arching element may also be present in the seating element. The arching element may then be moved by means of these wires in order to give rise to convexity of the seating element at a desired point.

The receptacles may also include receptacles for receiving heating, cooling and ventilating elements. The seat can be cooled or heated up by the seating element by means of elements of this kind For this purpose, the seating module preferably includes air ducts through which heated or cool air can flow. These air guides may, in particular, also include openings towards an outer side of the seat.

The receptacles may also include receptacles for massaging elements. Receptacles of this kind for massaging elements are preferably disposed, in particular, in a shoulder and back region.

A seating system according to an embodiment of the invention includes the seating element explained above and also a number of different functional elements which can be inserted in the seating element as required in order to equip a corresponding seat in the manner desired. With a seating system of this kind, seats with different levels of equipment can be made available in a simple manner, it being possible to always use the same seating element.

According to another embodiment of the present invention, a seating element comprises an archable element having a first side facing an occupant of a seat when the seating element is installed in a seat and a second side opposing said first side, and a pneumatic arching element to arch said archable element, said pneumatic arching element being arranged at said second side of said archable element.

In an embodiment, the archable element is a plate-like structure. In another embodiment, the archable element comprises longitudinal and transverse struts. In still another embodiment, the archable element is an extended element for distributing pressure exerted by the pneumatic arching element.

In an embodiment, the pneumatic arching element may comprise one or more inflatable bags, which may be made of plastic or another material. Manual or electric inflating means may be provided for inflating the one or more inflatable bags.

In an embodiment, the pneumatic arching element is moveable in the direction of a longitudinal axis of the archable element, i.e. an axis which when installed for example in the backrest of a seat corresponds to the up/down direction. In such an embodiment, the location of the apex of the arching element in the longitudinal direction may additionally be adjusted.

In such an embodiment, the archable element may be stationary, while the pneumatic arching element is moveable along guide elements. For example, the archable element may be part of a seating element extending substantially over the whole area of a backrest of a seat.

In an embodiment, the pneumatic arching element may be covered by a covering element like a flexible plastic plate, which moves together with the pneumatic arching element and is located between the pneumatic arching element and the archable element.

BRIEF DESCRIPTION OF THE DRAWINGS

Embodiments of the invention will be explained in greater detail below with reference to the appended drawings. In the drawings.

DETAILED DESCRIPTION OF EMBODIMENTS

Figure 1:
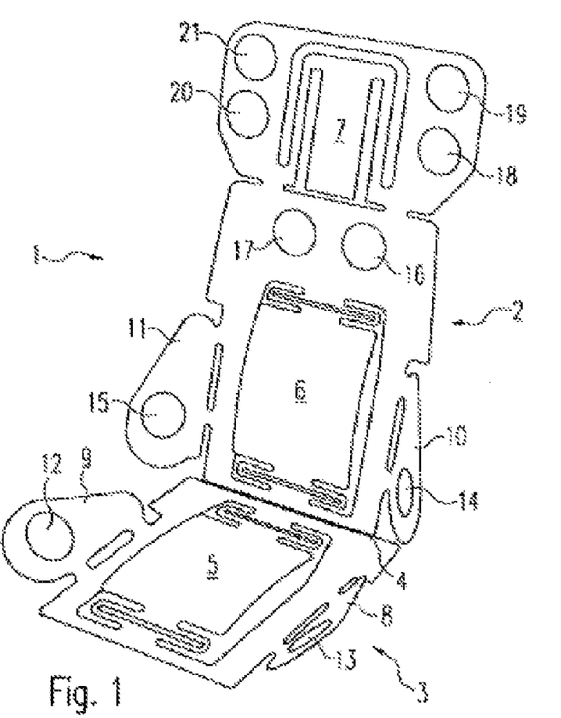
FIG. 1 shows a front view, in perspective, of a seating element according to an embodiment of the invention.

Represented in FIG. 1 is a front view, in perspective, of a seating element according to an embodiment of the invention, which serves as the basic module of a seating system according to an embodiment of the invention, which will be described in greater detail below. The seating element 1 includes a backrest section 2 and a seat section 3, which are connected by a hinge 4. The seating element 1 is preferably made of a plastic material, for example by injection moulding. In this case, the hinge 4 is preferably a film hinge or a succession of several film hinges, in order to be able to set an angle of inclination of the backrest section 2 relative to the seat section 3. However, it is equally possible to produce the backrest section 2 and the seat section 3 as separate parts. In this case, it is not necessary to connect the backrest section 2 and seat section 3 by a hinge; on the contrary, they may also be installed separately in corresponding sections of a seat. If the functionality of the seating element according to this embodiment of the invention is required only in the backrest or only in the seating surface of a seat, only the corresponding section may be provided.

The seating element 1 is intended for installation in a seat and is shaped in such a way that it offers support for a vehicle occupant who is sitting on the particular seat, that is to say, the seating element is ergonomically adapted to the shape of a seated body. For this purpose, in particular, a lumbar-arching plate 6, i.e. an archable element, is provided in a lumbar region, a shoulder-arching plate 7 in a shoulder/neck region, and a seat-arching plate 5 in the seat section 3. In the various regions or sections of the seat, it is also possible to provide more than one arching plate in each case, for example two or more seat-arching plates, or else individual arching plates may be omitted. By means of these arching plates, the corresponding parts of the body can be supported in a suitable manner. As will be explained in greater detail below, the arching plates 5-7 may also be coupled to corresponding adjusting mechanisms so that the convexity is adjustable. It is to be understood that it is possible to provide, both in the backrest section 2 and also in the seat section 3, more or fewer arching plates, as required, than are represented as examples in FIG. 1, for example an arching plate may also be provided in a chest region.

The seating element 1 also has side-pieces 10, 11 on the backrest section 2, and side-pieces 8, 9 on the seat section 3. These side-pieces impart lateral stability to an occupant sitting on the seat. In principle, side-pieces of this kind are known from so-called "sports seats", but may also be provided in other seats.

The seating element 1 also has a plurality of receptacles 12-21 in which various functional or luxury elements may be received. Functional elements of this kind may, for example, include massaging elements, fans, heating elements and the like. With the aid of heating elements and fans it is possible, for example, to heat up air and distribute it within the seat in order to thereby warm an occupant. On the other hand, it is also possible to either suck in cool air from the environment or to cool it by means of cooling elements in order to cool down the occupant. Finally, it is possible to massage a user by means of massaging elements in order to relax muscles which are inclined to suffer from cramp during car journeys. This is particularly the case in the region of the shoulders, so that massaging elements of this kind can be accommodated, for example, in receptacles 18 and 20. The functioning of the massaging elements can then, for example, be coupled to the abovementioned heat input, so that massaging takes place simultaneously with the said heat input. In this case, the heat input is preferably set or manually regulated in dependence upon the temperature in the vehicle and/or the outside temperature. The receptacles 12-21 may either be configured in a universal manner, so that various types of functional elements can be received, or else be designed for specific functional elements.

Other functional elements include, for example, elements which can be inserted in the receptacles 12-15 for the purpose of varying the thickness or position of the side-pieces 8-11. By means of elements of this kind, the side-pieces can be adapted to the particular occupant, it being possible to flatten out the side-pieces for the purpose of climbing in and out of the vehicle, in order to facilitate these actions. Elements of this kind for adjusting the side-pieces may be realised, for example, by means of inflatable gas bags.

In addition, it is possible to configure the connection between the side-pieces 8-11 and the seat section 3 or backrest section 2 after the fashion of a hinge, so that the side-pieces 8-11 can be adjusted by a folding movement.

Figure 2:
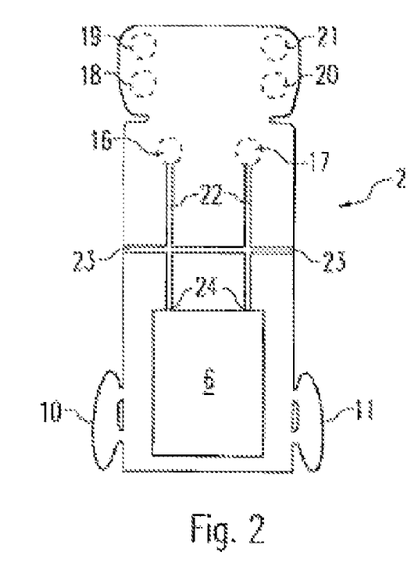
FIG. 2 shows a rear view of the seating element of FIG. 1.

As already described, fans, heating elements or cooling elements, inter alia, may be received in the receptacles 12-21, it being also possible to combine two or three of these functions in a single module, for example in the form of combined ventilating/heating elements. In order to conduct the air to the desired points within the seating element in the appropriate manner, air ducts or air guides are preferably provided in the seating element 1. This is shown by way of an example in FIG. 2, which shows a rear view of the backrest section 2 from FIG. 1. In this case, it is assumed, by way of an example, that ventilating elements of this kind can be received in the receptacles 16 and 17. As FIG. 2 shows, air guides 22 are provided which extend in a manner emanating from the receptacles 16 and 17 and end in orifices 24 on the lumbar arching plate 16. By means of another air guide extending transversely to the air guides 22, air can also be directed to openings 23 which lie on the sides of the seating element 2. The air guides 22 may, for example, be designed as ducts or bores in the seating element 2. However, they are preferably formed by ribs which extend in a parallel manner and which simultaneously serve to stiffen the seating element 1 or the backrest section 2.

If ventilating units are now disposed in the receptacles 16 and 17, air can be directed to the lumbar arching plate 6 via the openings 24 in order to thus cool or—in the case of a corresponding heating element—warm up the occupant's lower back. In addition, warmed-up air can, in this case, be directed towards the outside via the openings 23 in order to also warm the occupant at the sides. This is particularly advantageous in the case of modern engines such as, for example, diesel engines, which are optimized with respect to fuel consumption to such an extent that they only warm up very slowly, the effect of which is that a conventional heating system belonging to the vehicle only supplies warm air after a fairly long time. Warm air can be generated very rapidly by a heating element disposed in the seating element 1 and can warm the occupant via the openings 23.

The disposition of the air guides which is shown in FIG. 2 is to be understood merely as an example. There is the further possibility of also providing substantially more air guides in the seat section 3, and the air guides may emanate from others of the receptacles 12-21 so that corresponding ventilating, heating or cooling elements can also be disposed in these other receptacles. In addition, air guides are also preferably provided for sucking in air, for example from locations underneath the seat, since it is generally relatively cool there.

At the same time, it is also possible to provide, on the seating element 1, passive pumping elements which are activated by movements of an occupant on the seat in such a way that air for aerating the seat is pumped through the air guides 22. Thus aeration is possible, even without electrically operated fans.

Figure 3:
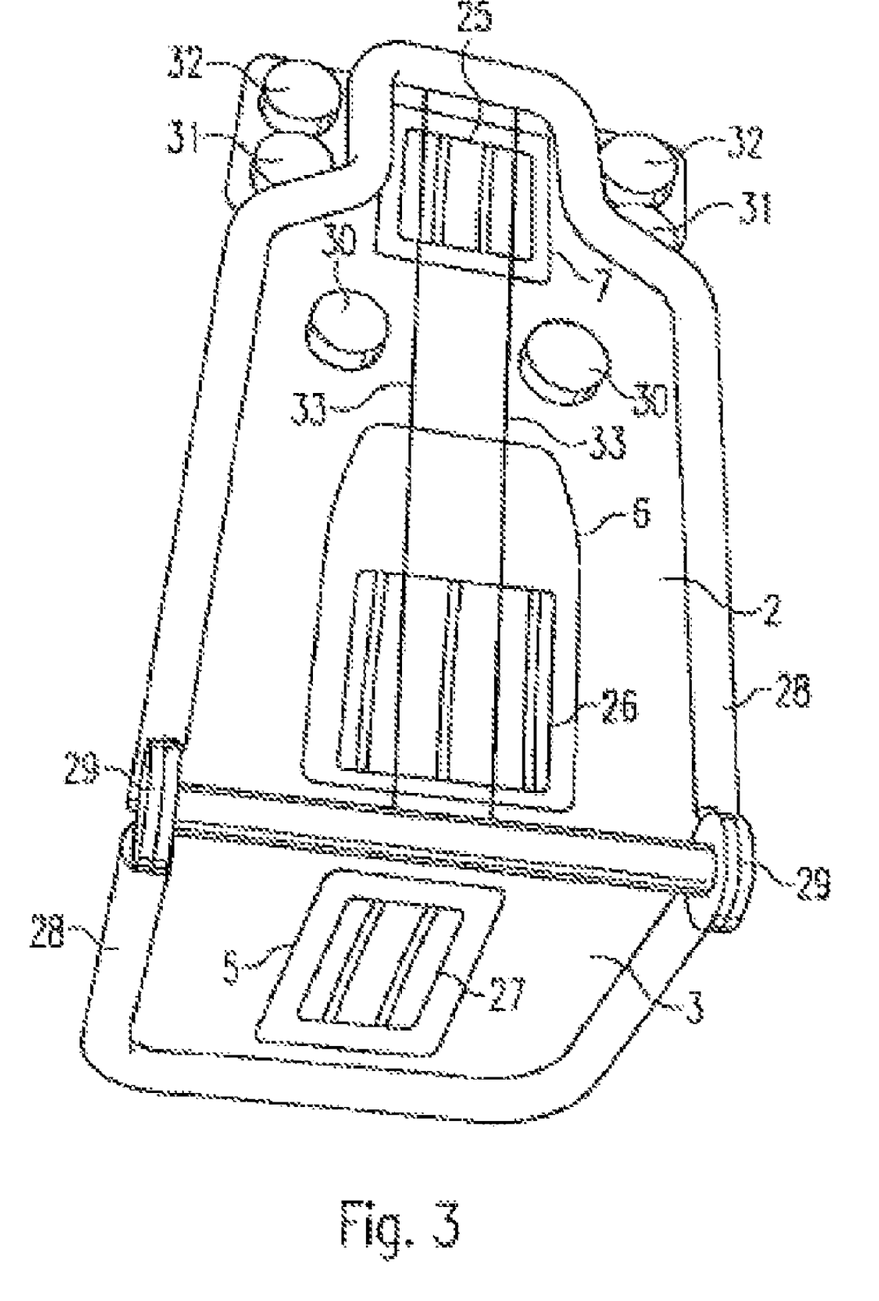
FIG. 3 shows a rear view, in perspective, of the seating element of FIG. 1 with additional functional elements.

FIG. 3 shows a rear view, in perspective, of the seating element 1 from FIG. 1, in a condition in which it is fastened to a seat frame 28. In addition, functional elements are installed in the receptacles 16-21 in FIG. 3; but for the sake of simplification, the side-pieces 8-11 and also the air guides from FIG. 2 are not represented.

Here, the seat frame 28 is formed by a backrest section and a seat section, which each include a tube which extends substantially along the contour of the seat. The backrest section and seat section of the seat frame 28 are connected by joints 29, in order to permit the setting of an angle of inclination of the seat backrest relative to the seating surface of the seat. In FIG. 3, the seating element 1 is fastened by fastening means (not represented) to the seat frame 28. For this purpose, use may be made of any type of known fastening means such as brackets, screws or clips. For this purpose, the seating element 1 may also be configured in such a way that it wholly or partially encompasses the seat frame 28.

As shown in FIG. 3, two wires 33, which are tensioned in the vertical direction in a substantially parallel manner, are attached to the backrest section 2 of the seating element 1 in this embodiment. The wires 24 may be moulded directly into the backrest section 2 during the injection-moulding operation, or else fastened to the section—for example by clipping them in. The wires 33 once again serve as a guide and receptacle for arching elements 25, 26 which are capable of adjusting the convexity of the seat-arching plate 5 and the shoulder-arching plate 7. Alternatively, the arching elements may also be fastened to the seating element 1 in some other way, for example by screws, hooks or clips, as is shown in FIG. 3 using the example of an arching element 27 for the seat-arching plate 5. In this case, the arching elements 25, 26, 27 may operate, for example, in accordance with that in the patent initially mentioned, EP 0 485 483, in which two oppositely located ends of an overall pressure element are moved up to one another in order to set the convexity of the overall pressure element. In this case, the overall pressure element may be plate-shaped or constructed in the form of longitudinal and transverse struts. The adjustable convexity of the particular arching element can be transmitted by pressure or tension to the particular arching plate 5, 6, 7 in order to set the convexity of the latter. By using the wires 33 or, alternatively, other guide elements, it is possible, in particular, to adjust a vertical position of the arching element 26 along the wires 33, so that a vertical position of the convexity, i.e. a location of an apex of the respective arching plate can also be set, in addition to the degree of convexity. The actuators needed for actuating the arching elements 25, 26, 27 may be integrated directly into the arching elements, under which circumstances, in the case of electric actuators, suitable wiring may already be integrated into the seating element 1 so that it is not necessary, for example in the case of retrofitting arching elements to a seat, to carry out any wiring operation. Instead of electrical actuators, actuators are also conceivably possible in which the transmission of force takes place, for example, via a shaft— optionally likewise provided in the seating element 1—which transmits to the particular arching element an adjusting movement generated by an occupant, for example by actuating a rotary knob. Furthermore, it is also possible to provide pneumatic arching elements in which a differing degree of convexity is brought about, for example as a result of the inflation of a gas bag, e.g. an air pocket.

In addition, or as an alternative, to the wires 33, other wires of suitable thickness may also be disposed in the seating element 1, which wires impart a desired shape to the latter or stabilise its shape. Wires may also be used in some other way in order to guide the arching element 26.

One advantage of the embodiment represented in FIGS. 1-3 lies in the fact that the arching elements 25, 26, 27 are disposed on the rear side of the seat, that is to say on the side that faces away from a user of the seat, whereas in conventional seats with adjustable arching systems, corresponding adjusting elements are usually disposed between a rigid internal structure of the seat and upholstery on the side facing towards the user. In the exemplified embodiment represented, the pressure caused by the user on the surface of the seat is absorbed and uniformly distributed by the seating element 1. The arching elements 25, 26, 27, on the other hand, act on the fixedly installed arching plates from the averted side, a fact which likewise makes a uniform pressure-distribution possible.

In particular, the pressure is thus always distributed by the seating element 1, irrespective of the configuration of the arching element, so that the type and configuration of the arching elements can be varied without the behaviour of the seat changing substantially. For example, the mechanical arching elements represented can be replaced by the pneumatic arching elements already mentioned, in which, for example, gas bags or air pockets are filled with air in order to bring about convexity, without the behaviour of the seat changing substantially as far as the user is concerned. In conventional pneumatic systems, on the other hand, air pockets of this kind press directly on a foamed-out or upholstered portion of the seat and are thus able to exert only a locally limited pressure.

If pneumatic arching elements are provided, the above-mentioned pneumatic arching elements, or other pneumatic adjusting elements, may be attached directly to the seating element. The way in which this comes about may, in particular, be that the pneumatic adjusting elements use the face of the seating element 1 as one wall of the air pockets or bags mentioned. Another possibility is the fixed attachment of an inherently airtight air pocket to said seating element.

In FIG. 3, ventilating/heating elements which warm up air, when required, and are able to distribute it for aeration purposes via the air guides which are not represented in FIG. 3 but are shown in FIG. 2, are received, by way of examples, in the receptacles 16 and 17 from FIG. 1. Provided in the shoulder region in the receptacles 18 and 20 are, for example, massaging elements 31 which are able to provide a massage in the shoulder region. In addition, there may be provided, in receptacles 19 and 21, heating elements 32 which, in this case, merely bring about warming-up without any circulation of the air. In this connection, the functional elements 30-32 are merely to be understood as examples, and other functional elements may also be employed, as required. The wiring, particularly for control and current-supply purposes, which is required for the functional elements 30-32, is preferably once again already provided in the seating element 1, so that simple conversion or retrofitting is possible.

In this connection, it should be mentioned that the arching elements 25, 26, 27 can also provide massaging functions, through the fact that the convexity is varied in time.

It is thus possible to realise modularly different levels of equipment in a simple manner with the aid of a seating system according to the invention with the seating element 1 serving as the basic module and the functional elements 25-27 and also 30-32 serving as add-on modules. In this connection, it is also possible for individual receptacles not to contain any functional elements, if these are not required for a particular level of equipment, and functional elements of different types and qualities (ones that can be actuated mechanically or electrically, ones with more or fewer possible settings, etc.) can be provided. It is also conceivably possible to insert fixed, that is to say rigid, elements in suitable receptacles instead of the arching elements 25-27, in order to fixedly predetermine the elasticity and shape of the arching plates 5-6. In this regard, it is also possible for bridges, which can be injection-moulded on, to be provided in the seating element 1 in order to obstruct movable parts such as the arching plates 5, 6, 7. In those versions of a corresponding seat in which adjustability of the particular movable part is to be provided, these bridges are then removed, for example by breaking them out.

Receptacles for functional elements may also be provided at points other than those indicated. If pneumatic adjusting elements are provided, for example as arching elements or as setting elements for the side-pieces 8-11 from FIG. 1, suitable air guides for these may also be provided in the seating element 1.

The seating element 1 may be combined with conventional seat upholstery. In this case, the entire seating element 1 may also be directly enveloped by foam in order to form the upholstery, and then be attached, as a unit, to the seat frame 28. However, said upholstery may also be attached directly or indirectly to the seating element 1 in some other way. However, since the seating element 1 is preferably configured in such a way that it is well adapted to the shape of a body and is thus able, itself, to provide for satisfactory pressure-distribution, it is also possible to provide only thin upholstery or some other layer, for example a suitable felt or a layer of foam. As a result of this, on the one hand material is saved and, on the other, the action of massaging elements is more effective.

It should be observed that individual elements of the seating element, for example arching plates or other structural elements, can also be produced separately from the rest of the seating element from other materials, such as wire mesh for example. Additional features of this kind may then, for example, also have movement-generating elements such as the arching elements mentioned. These separately produced elements then likewise form part of the seating element.

As already mentioned, the seating element 1 in an embodiment is preferably produced from a plastic by injection moulding. However, other materials or combinations of materials are also conceivably possible, e.g. a wire-mesh mat with wires which are contoured in a manner corresponding to the shape of the human body, and receiving facilities, which are mounted or are directly injection-moulded on at the same time, for the other components such as arching elements, fans or the like. Furthermore, the seating element may also contain other load-bearing structural parts of the seat as a whole, such as the seat frame for example, which are mounted on said seating element or fastened by enveloping injection moulding, or are integrated into said seating element in a combination of conventional mounting and enveloping injection moulding.

Figure 4:
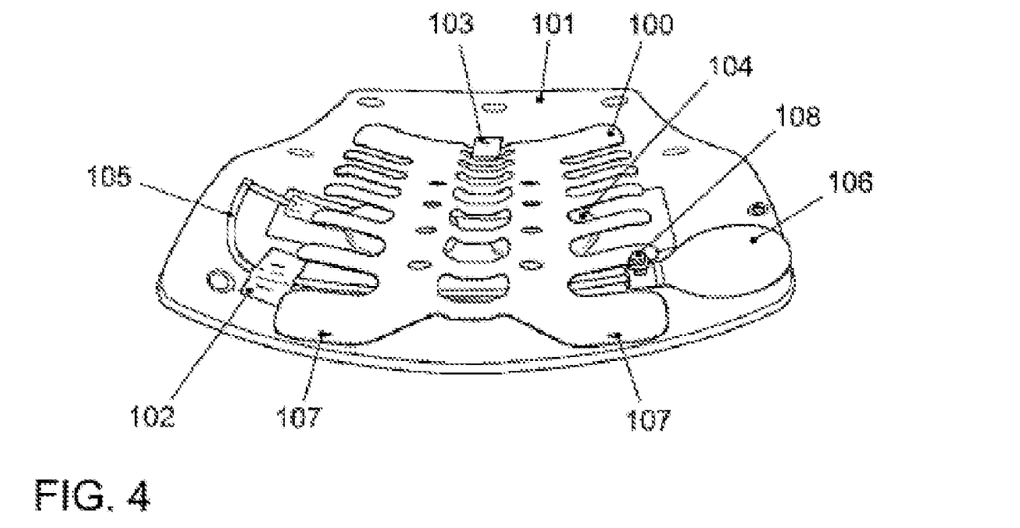
FIG. 4 shows a perspective view of a further embodiment of a seating element according to the invention.
Figure 5:
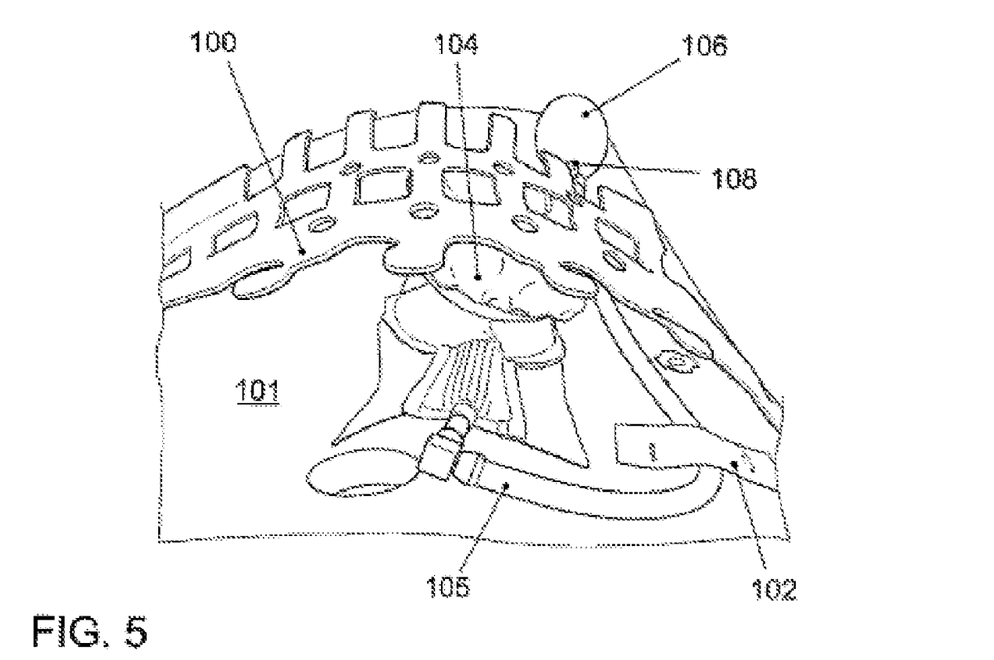
FIG. 5 shows a further perspective view of the embodiment of FIG. 4.

In FIGS. 4 and 5, a seating element according to a further embodiment of the present invention is shown. The seating element according to the embodiment of FIGS. 4 and 5 comprises an archable element 100 and a pneumatic arching element 104. In the embodiment shown, archable element 100 in an exemplary manner is fixed to a backrest 101 of a seat by a clip 103 and fixing means like screws, reverts and the like 107.

In the embodiment of FIG. 4, archable element 100 is an extended element made of plastic and comprising longitudinal and transversal struts to distribute pressure for example to the back of an occupant of a corresponding seat. In another embodiment, archable element 100 may be an arching plate or other type of element as discussed with reference to FIGS. 1-3. Between backrest 101 and archable element 100, as can be best seen in FIG. 5, a pneumatic arching element 104 is provided, which is formed as a plastic gas bag, which is inflatable with gas via a flexible tube 105 which in the embodiment shown is fixed to backrest 101 via a strap 102. In the embodiment of FIGS. 4 and 5, the plastic gasbag is formed of two pairs of two stacked chambers with lateral and horizontal communication passages formed therebetween. However, other gasbags like single-chamber gasbags may also be employed. A manual pumping balloon 106 serves for inflating pneumatic arching element 104 via flexible tube 105. When pneumatic arching element 104 is inflated, a curvature of archable element 100 is increased, wherein the pressure exerted by pneumatic arching element 104 is distributed over a wide area via archable element 100. Manual pump 106 in the embodiment of FIG. 4 furthermore comprises a vent 108 for deinflating pneumatic archable element 104. When pneumatic arching element 104 is deflated, in the embodiment of FIG. 4, archable element 100 returns to its original state through its inherent resiliency.

Figure 6:
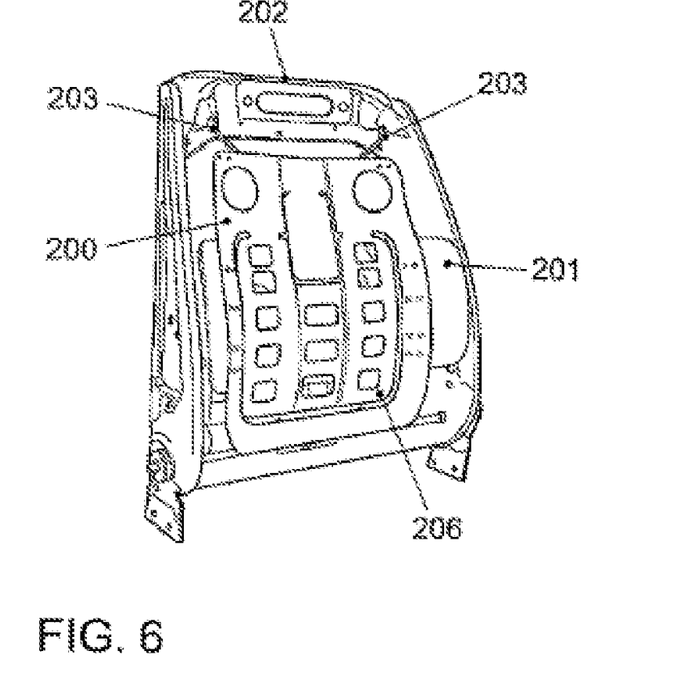
FIG. 6 shows a perspective view of a seating element according to another embodiment of the present invention.
Figure 7:
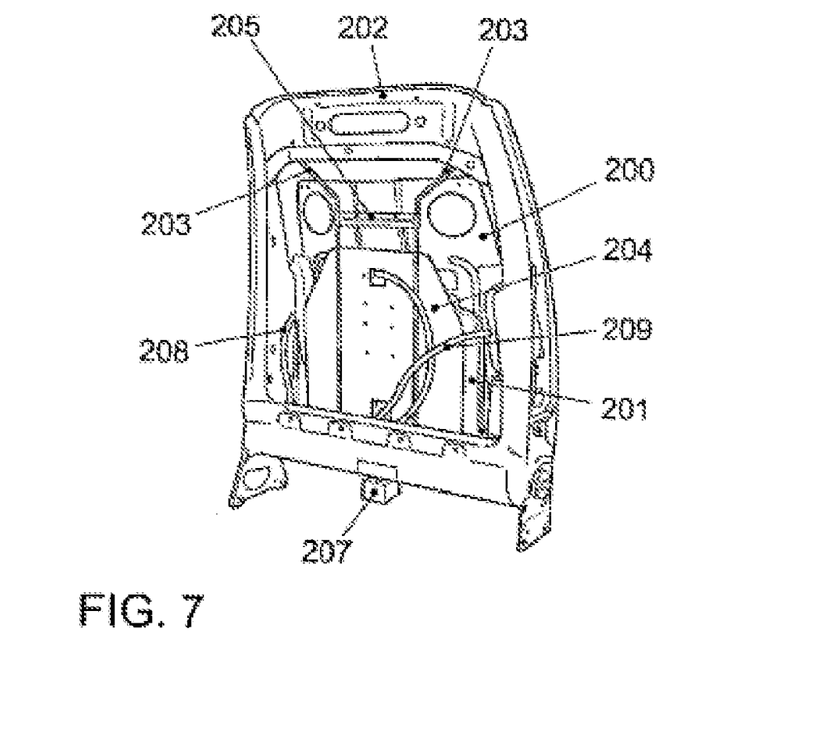
FIG. 7 shows a perspective back view of the embodiment of FIG. 6.

In FIGS. 6 and 7, a seating element according to another embodiment of the present invention is shown, wherein FIG. 6 shows a side of the seating element facing an occupant, for example the back of an occupant sitting in a corresponding seat, when the seating element is installed in a seat and FIG. 7 shows a perspective view (rear view) of the opposite side of the seating element. The seating element according to the embodiment of FIG. 6 comprises an archable element 200, a pneumatic arching element 201, and a counterplate 204.

In the embodiment of FIGS. 6 and 7, archable element 200 comprises an archable section 206 three sides of which are surrounded by a slit to provide an adequate resiliency. Furthermore, as can be seen in FIG. 6, archable element 200 comprises holes, which for example may be used for ventilation purposes and which also determine the resiliency of archable element 200. Archable element 200 may for example be made of a metal or a plastic.

Furthermore, as can be seen best in FIG. 7, in the embodiment of FIGS. 6 and 7, pneumatic arching element 201 is sandwiched between archable element 200 and counterplate 204. Counterplate 204 in the embodiment is a rigid plate, which may be made of any suitable material, for example made of metal or plastic.

In an exemplary manner, in FIGS. 6 and 7, the seating element comprising archable element 200, pneumatic arching element 201 and counterplate 204 is suspended in a seat frame 202 using wires 203 and a fixation plate 205. However, the seating element may also be suspended in or fixed to a seat in a different manner.

Similar to the embodiment of FIGS. 4 and 5, the pneumatic arching element comprises a gas bag. In the embodiment of FIGS. 6 and 7, pneumatic arching element 201 is coupled with a pump 207 via a flexible tube 209. When pump 207, which in this case is an electrical pump, is activated, pneumatic arching element 201 is inflated to change the curvature of archable element 200, in particular archable section 206 thereof. Furthermore, in the embodiment of FIGS. 6 and 7, a flexible tube 208 is provided for deflating a pneumatic arching element 201.

The seating element according to the embodiments of FIGS. 4 to 7 serve only as further examples for implementing the invention, and further modifications and variants to those shown in the Figures are possible. For example, while the archable elements 100 and 200 are both formed in one piece, in other embodiments, archable elements made of a plurality of separate pieces, for example a grid-like structure with longitudinal and transverse struts, may be used. A pneumatic arching element in an embodiment may comprise one or more inflatable chambers. Furthermore, as mentioned already with respect to the embodiment of FIGS. 1-3, in an embodiment, a pneumatic arching element may be partially combined with an archable element, for example such that one wall of a gas bag is formed by the archable element. As already explained, both manual and electric pumps are possible for inflating and/or deflating the pneumatic arching element. Moreover, while the embodiments shown use air for inflating a gas bag of the pneumatic arching element, other fluids, both gases and liquid, may be used in embodiments of the invention.

Next, a seating element according to a further embodiment of the present invention will be explained with reference to FIGS. 8-15. FIGS. 8-11 show views of a seating element 300 in various partially assembled states, whereas FIGS. 12-15 show views of the seating element 300 according to this embodiment in a completely assembled state.

The embodiment of FIGS. 8-15 is related to the embodiment previously discussed with reference to FIGS. 4-7 and, as will be described below in detail, comprises a pneumatic arching element and an archable element.

Figure 8:
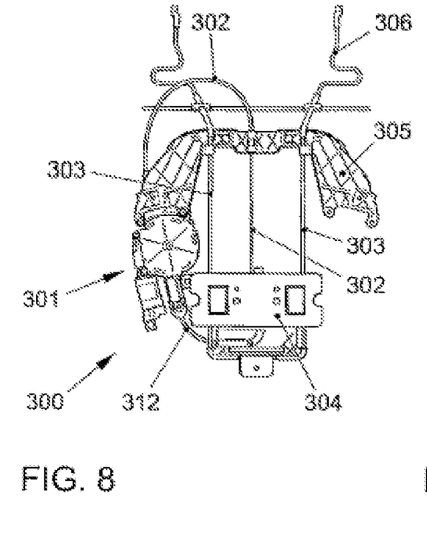
FIG. 8 shows a view of a partially assembled seating element according to still another embodiment of the present invention.

In FIG. 8, a view of a seating element 300 according to the currently discussed embodiment in a first partially assembled state is shown. In FIG. 1, the partially assembled seating element 300 comprises a frame structure 305, 306 for mounting the seating element in a seat, for example in a backrest thereof, a drive unit 301 mounted to the frame structure 305, two guide rails 303 and a plate 304 mounted slidable on the guide rails 303. Drive unit 301 is coupled with plate 304 via two cables 302, 312. By mutually shortening and lengthening cables 302, 312, plate 34 is moveable along guide rails 303 by controlling drive unit 301 accordingly.

Figure 9:
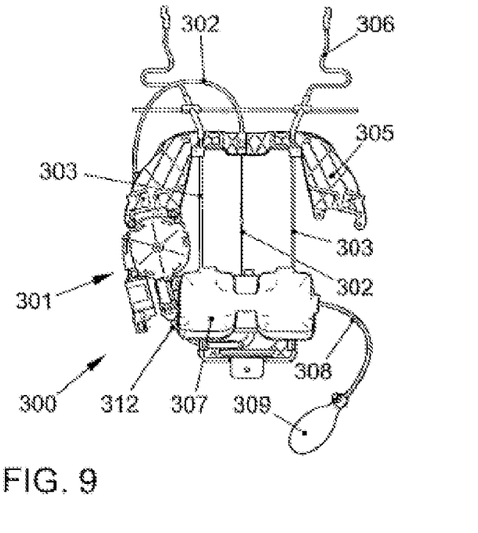
FIG. 9 shows a view of the seating element of FIG. 8 with additional components added.

In FIG. 9, the seating element of FIG. 8 is shown in a second partially assembled state where a pneumatic arching element 307 formed as a plastic gas bag is mounted to plate 304, plate 304 thus coupling pneumatic arching element 307 with guide rails 303. Pneumatic arching element 307 is similar to pneumatic arching elements 104, 201 of the embodiments of FIGS. 4-7. In particular, in the embodiment of FIGS. 8-15 pneumatic arching element may also comprise two pairs of stacked chambers vertically and horizontally communicating with each other as shown in the Figures, although other forms of gasbags are equally possible.

In order to inflate pneumatic arching element 307, a manual pump 309 similar to the one already described with reference to FIGS. 4 and 5 is connected with pneumatic arching element 307 via a flexible tube 308. In a different embodiment, an electrical pump additionally or alternatively may be provided.

Figure 10:
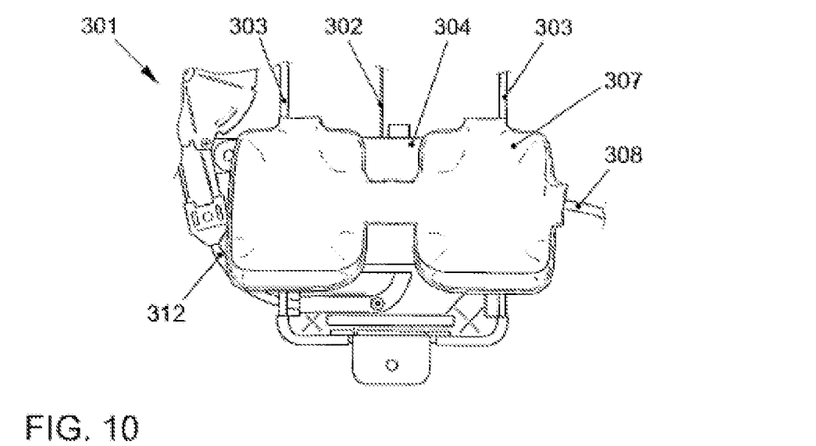
FIG. 10 shows an enlarged partial view of FIG. 9.

In FIG. 10, an enlarged view of the seating element of FIG. 9 is shown, wherein the pneumatic arching element 307 may be seen in more detail.

Figure 11:
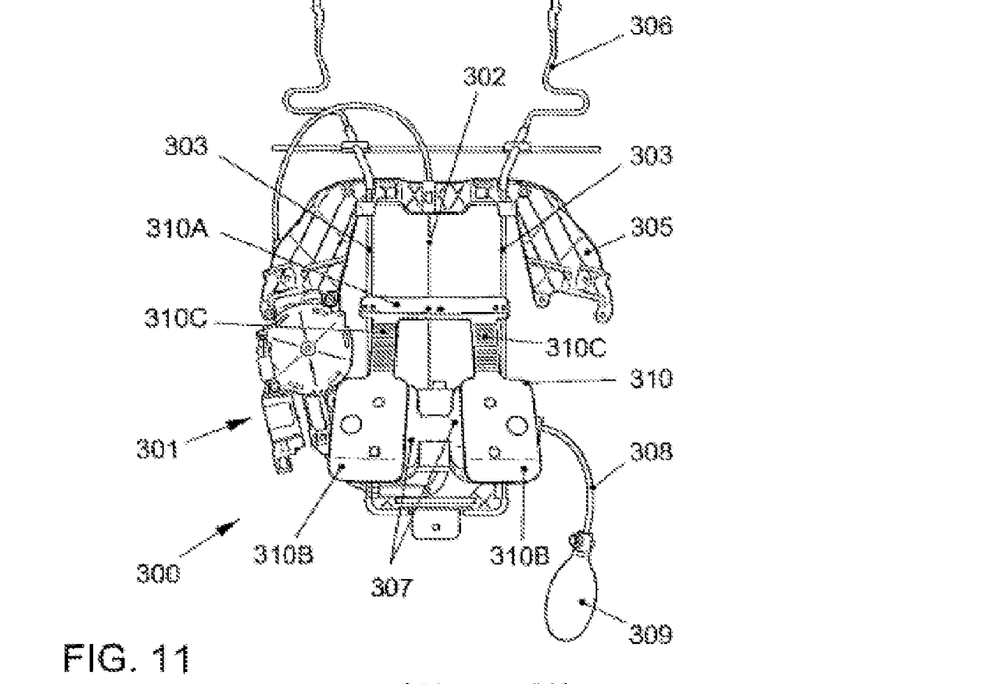
FIG. 11 shows a view of the seating element of FIG. 9 with further components added.

In FIG. 11, the seating element according to the embodiment of FIGS. 8-10 is shown in a third partially assembled state, where a cover element 310 has been added to the structure shown in FIGS. 9 and 10. Cover element 310 in the embodiment shown is made of a flexible plastic material and covers pneumatic arching element 307. In the embodiment shown in FIG. 11, cover element 310 is coupled with guide rails 303 and cable 302 such that it is moved together with plate 304 and pneumatic arching element 307 when drive unit 301 is activated. In the embodiment of FIG. 11, in particular cover element 310 comprises a cross bar 310A, which is coupled with guide rails 303 and cable 302, said cross bar 310A being coupled via corrugated flexible portions 310C with cover portions 310B. In the embodiment shown in FIG. 11, cover element 310 comprising portions 310A, 310B and 310C is a single plastic piece. In another embodiment, cover element 310 may consist of a plurality of pieces.

Figure 12:
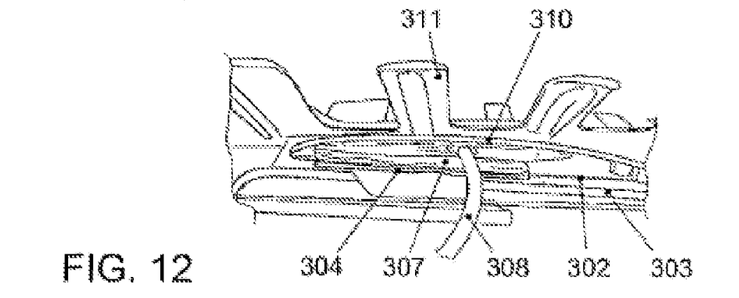
FIG. 12 shows a partial side view of the embodiment of FIGS. 8-11 in a fully assembled state, wherein a pneumatic element is not inflated.
Figure 13:
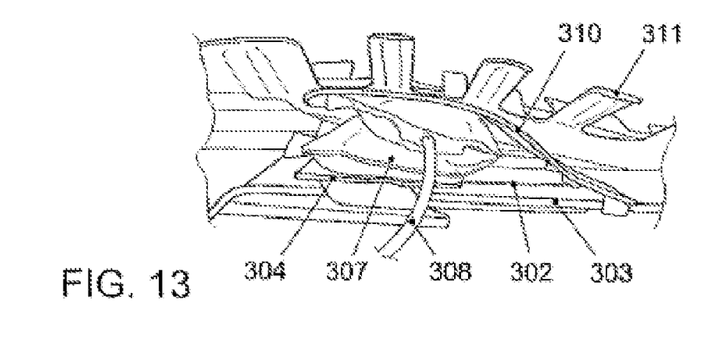
FIG. 13 shows a view corresponding to FIG. 12, wherein a pneumatic element is inflated.
Figure 14:
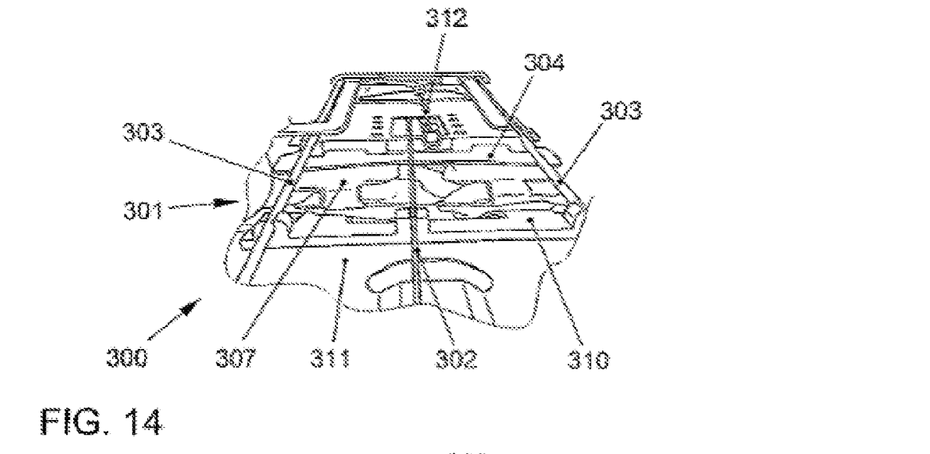
FIG. 14 shows a perspective view of the fully assembled embodiment of FIGS. 12 and 13.
Figure 15:
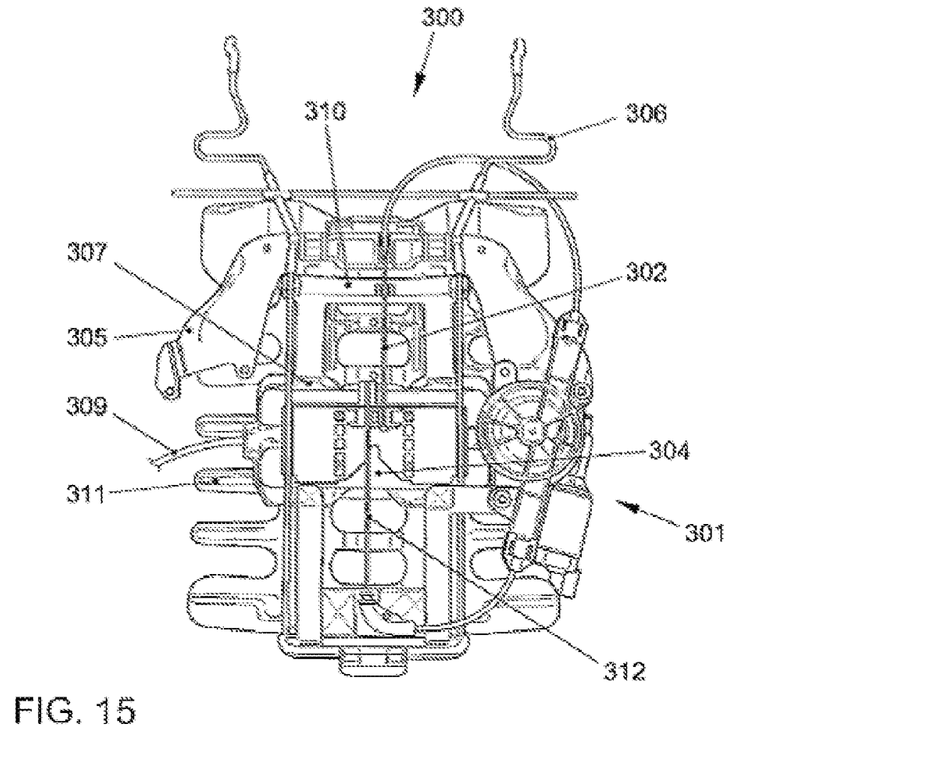
FIG. 15 shows a rear view of the fully assembled embodiment of FIGS. 12-14.

In FIG. 12-15, various views of the seating element 300 in a fully assembled state are shown. In particular, FIG. 12 shows a partial side view, wherein pneumatic arching element 307 is not inflated, FIG. 13 shows a partial side view, wherein pneumatic arching element 307 is inflated, FIG. 14 shows a perspective top view and FIG. 15 shows a rear view.

Compared with FIG. 11, an archable element 311 has been added. In the embodiment shown in FIGS. 12-15, archable element 311 is an element comprising longitudinal and transverse struts. However, other types of archable elements as already discussed with respect to the embodiments of FIGS. 1-7, for example plate like elements, may also be used.

In the embodiment shown, archable element 311 is mounted to frame structure 305 and remains stationary when plate 304 together with pneumatic arching element 307 and cover element 310 moves driven by drive unit 301. As cover element 310 is provided, the moveable parts glide smoothly along the backside (i.e. the side facing away from an occupant of a seat in a built-in state) of archable element 311. As can be best seen in FIGS. 12 and 13, by inflating pneumatic arching element 307, a curvature of archable elements 311 can be adjusted. Moreover, by moving pneumatic arching element 307 together with the plate 304 and cover element 310 along guide rails 303, a position of the apex of the curvature in the direction of guide rails 303 may be adjusted.

The mechanism for moving plate 304 together with pneumatic arching element 307 and cover element 310 along guide rails 303, which already has been explained briefly with reference to FIG. 8 may be best seen in FIGS. 14 and 15. The ends of cables 302 and 312 are anchored at the backside of plate 304. As can be seen in FIG. 15, drive unit 301 acts on both cables such that when drive unit 301 is actuated, one of cables 302, 312 is shortened while the other one of cables 302, 312 is lengthened, thus moving plate 304 in a desired direction. Moreover, since cover element 310 is fixed to cable 302 as can be seen in FIGS. 14 and 15, cover element 310 moves together with plate 304 and pneumatic arching element 307.

Figure 16:
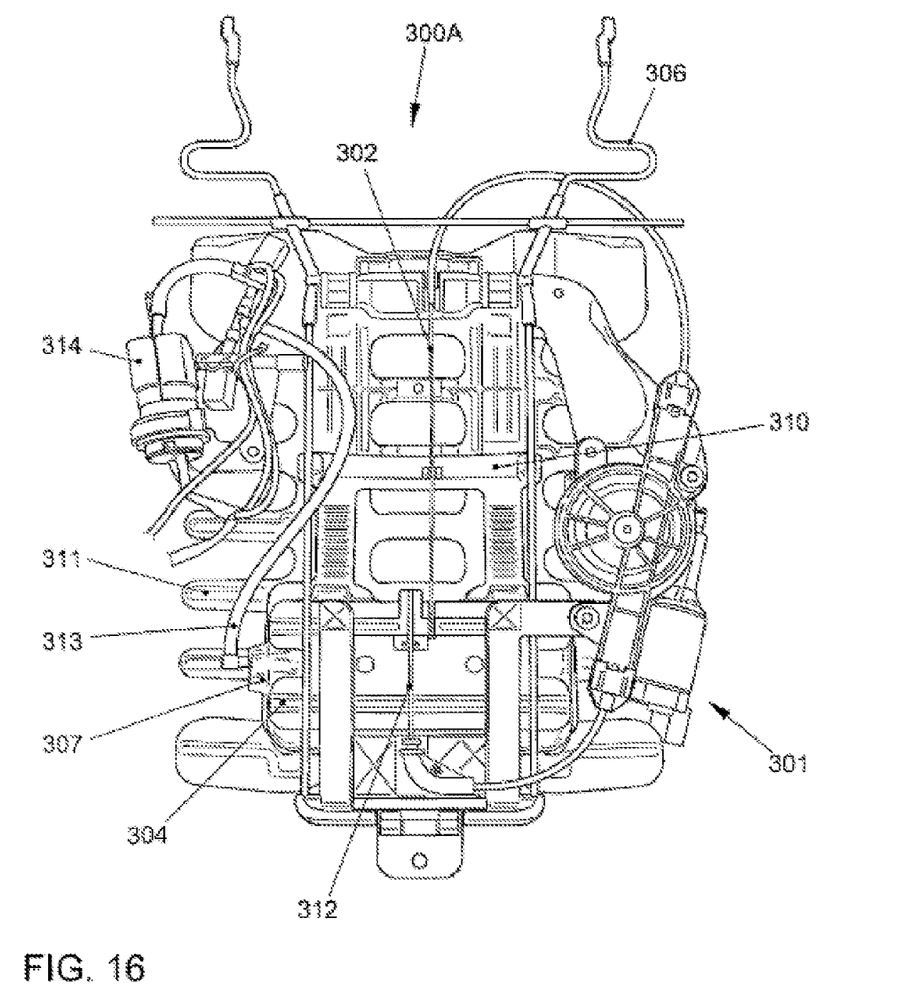
FIG. 16 shows a rear view of a fully assembled further embodiment of the invention.
Figure 17:
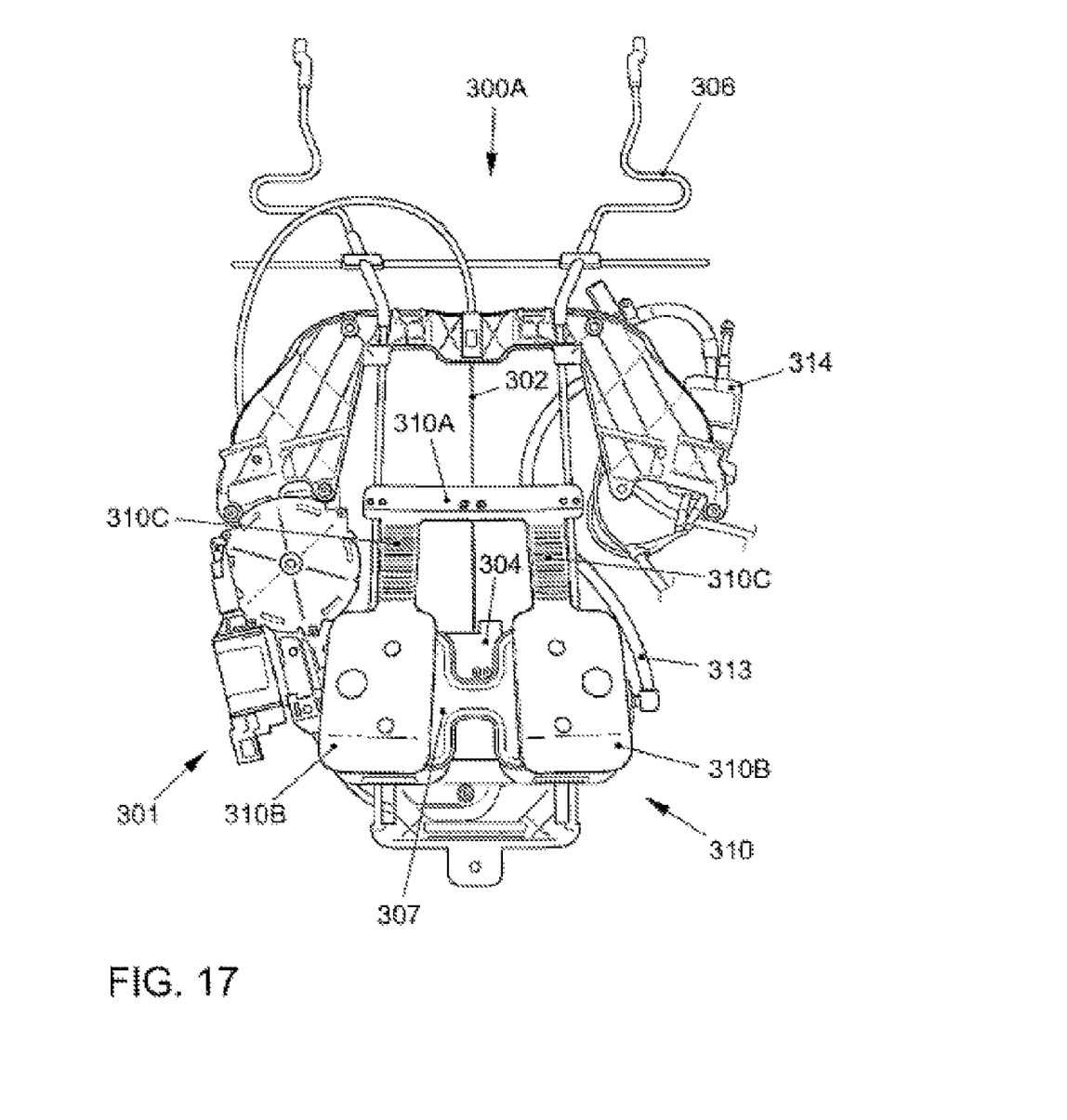
FIG. 17 shows a front view of the partially assembled embodiment of FIG. 16.

In FIGS. 16 and 17, a further embodiment of a seating element is shown which is a variation of the embodiment of FIGS. 8 to 15. Like elements bear the same reference numerals and will not be described again. FIG. 16 shows a fully assembled rear view similar to the view of FIG. 15, and FIG. 17 shows a partially assembled front view without archable element 311 similar to the view of FIG. 11.

In the embodiment of FIGS. 16 and 17, manual pump 309 and flexible tube 308 have been replaced by an electrical pump 314 which is connected with pneumatic arching element 307 via a tube 313.

The embodiments shown in FIGS. 8-17 are intended to serve as a further example for illustrating the present invention and is not to be construed as limiting. For example, the modifications already discussed with respect to the embodiment of FIGS. 4-7 are generally also applicable to the embodiment of FIGS. 8-15. Furthermore, instead of electrical driving unit 301, a manual drive unit may also be provided. In another embodiment, instead of moving plate 304 together with pneumatic arching element 307 and cover element 310 using wires, other mechanisms like gear mechanisms may be used. More than two guide rails may be provided, or other forms of guiding elements, for example wires as shown in FIG. 3, may be used. A seating element like seating element 300 of FIGS. 8-15 may be integrated in the embodiment of FIGS. 1-3. In such a case, arching plate 5, 6 and/or 7 serves as archable element, and a mechanism comprising guiding elements, a drive unit, a pneumatic arching element and a cover plate are provided to adjustably arch the arching plate. Other embodiments combining a pneumatic arching element with mechanical elements like an archable element or a vertical adjustment, which may also be referred to as a hybrid adjustment mechanism, may also be provided.

What is claimed is:

1. A seating element comprising:
    an archable element having a first side to face an occupant of a seat when the seating element is installed in a seat and a second side opposite of said first side;
    a pneumatic arching element arranged at said second side of said archable element;
    at least one guiding element to guide said pneumatic arching element in a longitudinal direction of said archable element;
    a coupling element coupling said pneumatic arching element with said guiding element; and
    a drive unit to drive said pneumatic arching element in said longitudinal direction of said archable element.

2. The seating element according to claim 1, wherein said coupling element comprises a plate.

3. The seating element according to claim 1, wherein said seating element further comprises a cover element arranged between said archable element and said pneumatic arching element and being moveable together with said pneumatic arching element in said longitudinal direction of said archable element.

4. The seating element according to claim 3, wherein said cover element comprises a flexible plastic element.

5. The seating element according to claim 1, wherein the drive unit is coupled with said coupling element via at least one wire.

6. The seating element according to claim 1, wherein said archable element comprises a plate element.

7. The seating element according to claim 1, wherein said archable element is configured to provide an extended pressure distribution to a seat occupant.

8. The seating element according to claim 1, wherein said pneumatic arching element comprises an inflatable gas bag.

9. The seating element according to claim 8, wherein said gas bag comprises at least two communicating chambers.

10. The seating element according to claim 9, wherein said at least two communicating chambers comprise two pairs of stacked chambers.

11. The seating element according to claim 1, further comprising a pump to inflate said pneumatic arching element.

12. The seating element according to claim 11, wherein said pump is chosen from the group consisting of a manual pump and an electric pump.

13. The seating element according to claim 1, further comprising a counter plate, wherein said pneumatic arching element is sandwiched between said archable element and said counter plate.

14. The seating element according to claim 1, wherein that seating element comprises mounting elements to mount said seating element to a seat.

15. The seating element according to claim 1, further comprising a vent to deflate said pneumatic arching element.

16. The seating element according to claim 1, wherein said pneumatic arching element comprises an inflatable gas bag comprising a first pair of stacked chambers and a second pair of stacked chambers with a horizontal communication passage formed between said first pair of stacked chambers and second pair of stacked chambers.

17. The seating element according to claim 16, further comprising a tube connected to said first pair of stacked chambers adapted to feed gas into said first pair of stacked chambers, the gas being distributed from said first pair of stacked chambers to said second pair of stacked chambers via said horizontal communication passage.

18. The seating element according to claim 17, wherein all of the gas in said second pair of stacked chambers is received from said first pair of stacked chambers through said horizontal communication passage.

19. A seating element comprising:
    an archable element having a first side to face an occupant of a seat when the seating element is installed in a seat and a second side opposite of said first side;
    a pneumatic arching element arranged at said second side of said archable element;
    at least one guiding element to guide said pneumatic arching element in a longitudinal direction of said archable element, wherein said at least one guiding element comprises at least two guide rails; and
    a coupling element coupling said pneumatic arching element with said guiding element.

20. A seating element comprising:
an archable element having a first side to face an occupant of a seat when the seating element is installed in a seat and a second side opposite of said first side, wherein said archable element comprises longitudinal struts linked by transverse struts;
a pneumatic arching element arranged at said second side of said archable element;
at least one guiding element to guide said pneumatic arching element in a longitudinal direction of said archable element; and
a coupling element coupling said pneumatic arching element with said guiding element.

* * * * *